(12) United States Patent
Yen et al.

(10) Patent No.: US 8,860,528 B2
(45) Date of Patent: Oct. 14, 2014

(54) EQUALIZER FOR LOSS-COMPENSATION OF HIGH-FREQUENCY SIGNALS GENERATED IN TRANSMISSION CHANNELS

(71) Applicant: Hon Hai Precision Industry Co., Ltd., New Taipei (TW)

(72) Inventors: Shin-Ting Yen, New Taipei (TW); Chien-Hsun Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 30 days.

(21) Appl. No.: 13/726,624

(22) Filed: Dec. 26, 2012

(65) Prior Publication Data
US 2014/0167888 A1    Jun. 19, 2014

(30) Foreign Application Priority Data
Dec. 13, 2012    (TW) ............................... 101147135 A

(51) Int. Cl.
*H04B 3/14*    (2006.01)
(52) U.S. Cl.
CPC ...................................... *H04B 3/14* (2013.01)
USPC ....................................................... 333/28 R

(58) Field of Classification Search
USPC ........................... 333/28 R, 1, 4, 5, 238, 246
See application file for complete search history.

(56) References Cited

U.S. PATENT DOCUMENTS

| 7,190,244 B2 * | 3/2007 | Hettak | 333/263 |
| 2012/0194304 A1 * | 8/2012 | Muraoka | 333/28 R |
| 2013/0272363 A1 * | 10/2013 | Hsieh et al. | 375/229 |

* cited by examiner

*Primary Examiner* — Stephen Jones
(74) *Attorney, Agent, or Firm* — Novak Druce Connolly Bove + Quigg LLP

(57) ABSTRACT

An equalizer includes a circuit board and a compensation module. The compensation module includes first and second transmission lines, first to fourth resistors, and first to fourth micro-strips. Two vias extend through the circuit board and are grounded. First terminals of the first and second resistors are electrically connected to the ground layer through the first via. First terminals of the third and fourth resistors are electrically connected to the ground layer through the second via. A second terminal of the first resistor is electrically connected to the first transmission line through the first micro-strip, and is further electrically connected to a second terminal of the second resistor through the second micro-strip. A second terminal of the third resistor is electrically connected to the second transmission line through the third micro-strip, and is further electrically connected to a second terminal of the fourth resistor through the fourth micro-strip.

4 Claims, 5 Drawing Sheets

EQUALIZER FOR LOSS-COMPENSATION OF HIGH-FREQUENCY SIGNALS GENERATED IN TRANSMISSION CHANNELS

BACKGROUND

1. Technical Field

The present disclosure relates to equalizers used in electronic communication, and particularly to an equalizer providing signal loss-compensation.

2. Description of Related Art

In electronic communications, high-frequency signals may be attenuated during transmission, this attenuation may lead to transmission loss. The transmission loss of high-frequency signals may result in data loss. Equalizers may be used to compensate for the attenuation of high-frequency signals. However, equalizers are expensive and for extended transmission distances, equalizers may be cost-prohibitive.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the various figures.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
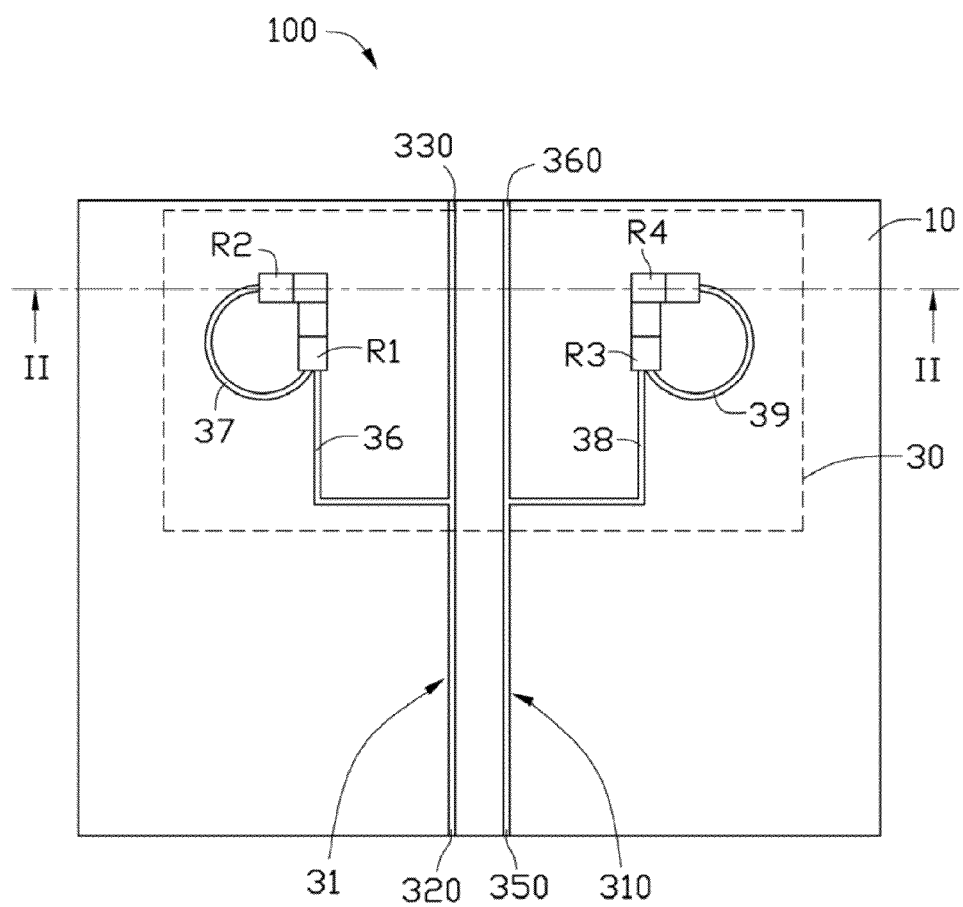
FIG. 1 is a plan view of an equalizer, according to an embodiment.

FIG. 1 is a plan view of an equalizer 100, according to an embodiment. The equalizer 100 can be used in an electronic device, for example, a personal computer (PC) or a mobile phone, to improve electronic communication quality. When high-frequency signals are transmitted in the electronic device, the equalizer 100 can compensate for attenuation of the high-frequency signals.

Figure 2:
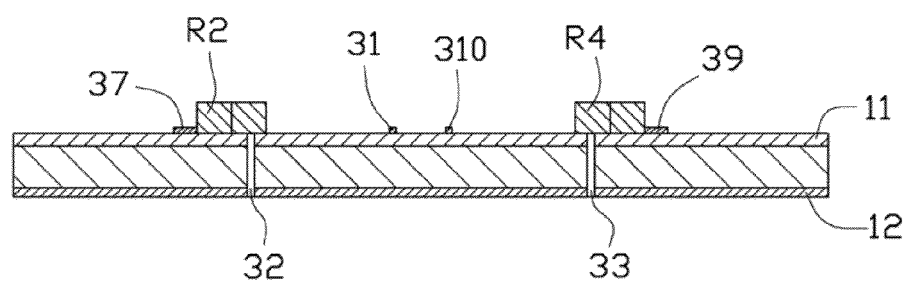
FIG. 2 is a sectional view of the equalizer shown in FIG. 1, taken along the line of II-II.

The equalizer 100 includes a circuit board 10 and a compensation module 30 mounted in the circuit board 10. In this embodiment, the circuit board 10 is a multilayer circuit board. In FIG. 2, only a signal layer 11 and a ground layer 12 of the circuit board 10 are shown.

The compensation module 30 includes two transmission lines 31 and 310, a first compensation unit, and a second compensation unit. The first compensation unit includes a via 32, two resistors R1 and R2, and two micro-strips 36 and 37. The second compensation unit includes a via 33, two resistors R3 and R4, and two micro-strips 38 and 39. The first compensation unit and the second compensation unit are symmetric with a middle line between the transmission lines 31 and 310. The two vias 32 and 33 extend through the circuit board 10 and are electrically connected to the ground layer 12.

The transmission lines 31 and 310, the four resistors R1, R2, R3, and R4, and the four micro-strips 36-39 are mounted on an outer surface of the signal layer 11. A first terminal of the resistor R1 is electrically connected to a first terminal of the resistor R2, and is electrically connected to the via 32, such that the first terminals of the resistors R1 and R2 are electrically connected to the ground layer 12. A first terminal of the resistor R3 is electrically connected to a first terminal of the resistor R4, and is electrically connected to the via 33, such that the first terminals of the resistors R3 and R4 are electrically connected to the ground layer 12.

A second terminal of the resistor R1 is electrically connected to the transmission line 31 through the micro-strip 36. The second terminal of the resistor R1 is further electrically connected to a second terminal of the resistor R2 through the micro-strip 37. A second terminal of the resistor R3 is electrically connected to the transmission line 310 through the micro-strip 38. The second terminal of the resistor R3 is further electrically connected to a second terminal of the resistor R4 through the micro-strip 39. In the embodiment, each of the micro-strips 36 and 38 is made up two perpendicular lines, and each of the micro-strips 37 and 39 is a smooth curve.

In use, a high-frequency electronic communication signal (e.g., a differential signal) transmitted through the signal layers 11 of the circuit board 10 is received by a first terminal 320 of the transmission line 31. A first part of the signal is transmitted to a second terminal 330 of the transmission line 31 directly. A second part of the signal is transmitted to the resistor R2 through the micro-strip 36, and is reflected back to the second terminal 330 of the transmission line 31 by the resistor R2. Thus, the second part of the signal is outputted from the second terminal 330 of the transmission line 31 to enhance the first part of the signal, and the output of the equalizer 100 obtains one stage of compensation. A third part of the signal is transmitted to the resistor R2 through the micro-strips 36, the resistor R1, and the micro-strip 37 in that order, and is reflected back to the second terminal 330 of the transmission line 31 by the resistor R2. Thus, the third part of the signal is outputted from the second terminal 330 of the transmission line 31 to further enhance the first part of the signal, and the output of the equalizer 100 is given a second stage of compensation. In this way, transmission losses of the signal can be effectively compensated.

Furthermore, the high-frequency electronic communication signal (e.g., a differential signal) transmitted through the signal layer 11 of the circuit board 10 is also received by a first terminal 350 of the transmission line 310. A first part of the signal is transmitted to a second terminal 360 of the transmission line 310 directly. A second part of the signal is transmitted to the resistor R3 through the micro-strip 38, and is reflected back to the second terminal 360 of the transmission line 310 by the resistor R3. Thus, the second part of the signal is outputted from the second terminal 360 of the transmission line 310 to enhance the first part of the signal, and the output of the equalizer 100 obtains one stage of compensation. A third part of the signal is transmitted to the resistor R4 through the micro-strips 38, the resistor R3, and the micro-strip 39 in that order, and is reflected back to the second terminal 360 of the transmission line 310 by the resistor R4. Thus, the third part of the signal is outputted from the second terminal 360 of the transmission line 310 to further enhance the first part of the signal, and the output of the equalizer 100 is given a second stage of compensation. In this way, transmission losses of the signal can be effectively compensated.

Figure 3:
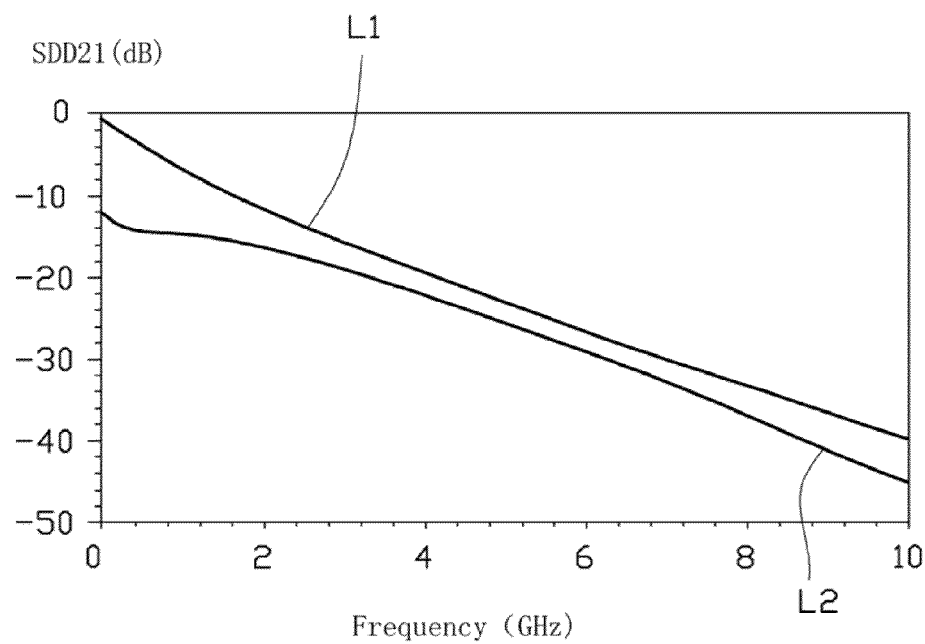
FIG. 3 is a diagram comparing a wave shape of a signal that has not been processed by the equalizer shown in FIG. 1 and a wave shape of the signal that has been processed by the equalizer shown in FIG. 1.

FIG. 3 is a diagram comparing a wave shape of a signal (e.g., a high-frequency electronic communication signal) that has not been processed by the equalizer 100 and a wave shape of the signal that has been processed by the equalizer 100. The curve L1 shows the wave shape of the signal that has not been processed by the equalizer 100, and the curve L2 shows the wave shape of the signal that has been processed by the equalizer 100. The equalizer 100 provides adequate compensation for high-frequency parts of electronic communication signals.

Figure 4:
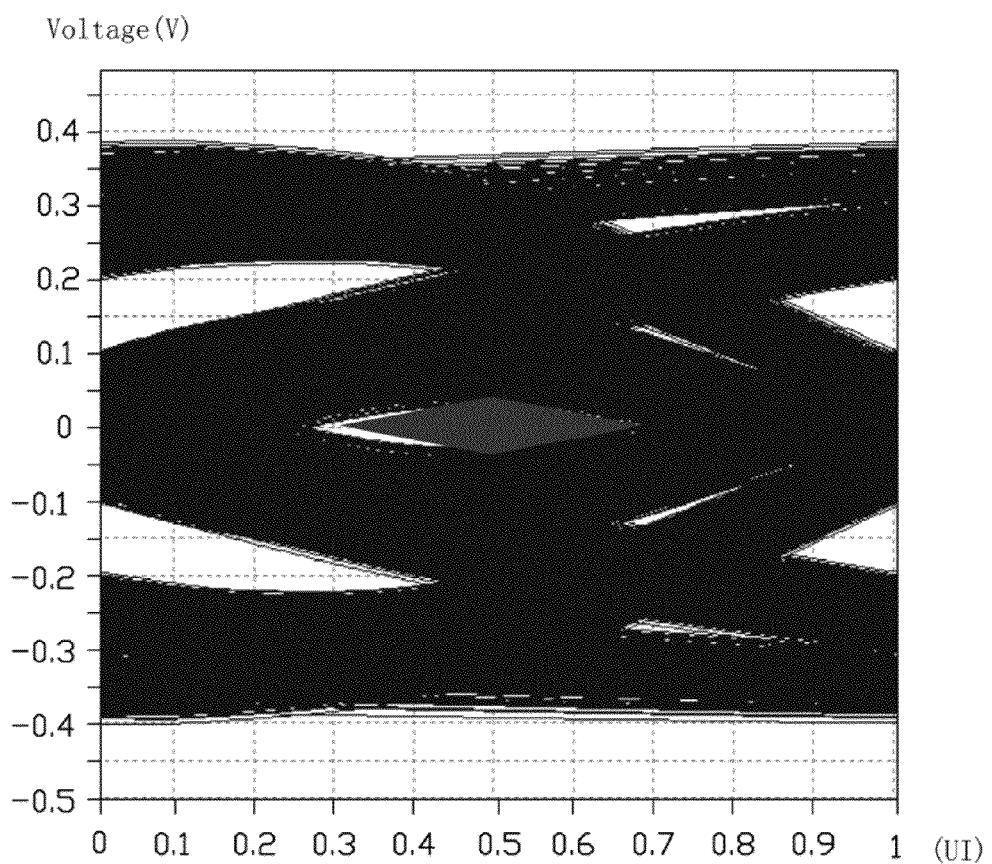
FIG. 4 is an eye pattern of the signal that has not been processed by the equalizer shown in FIG. 1 and has the wave shape shown in FIG. 3.
Figure 5:
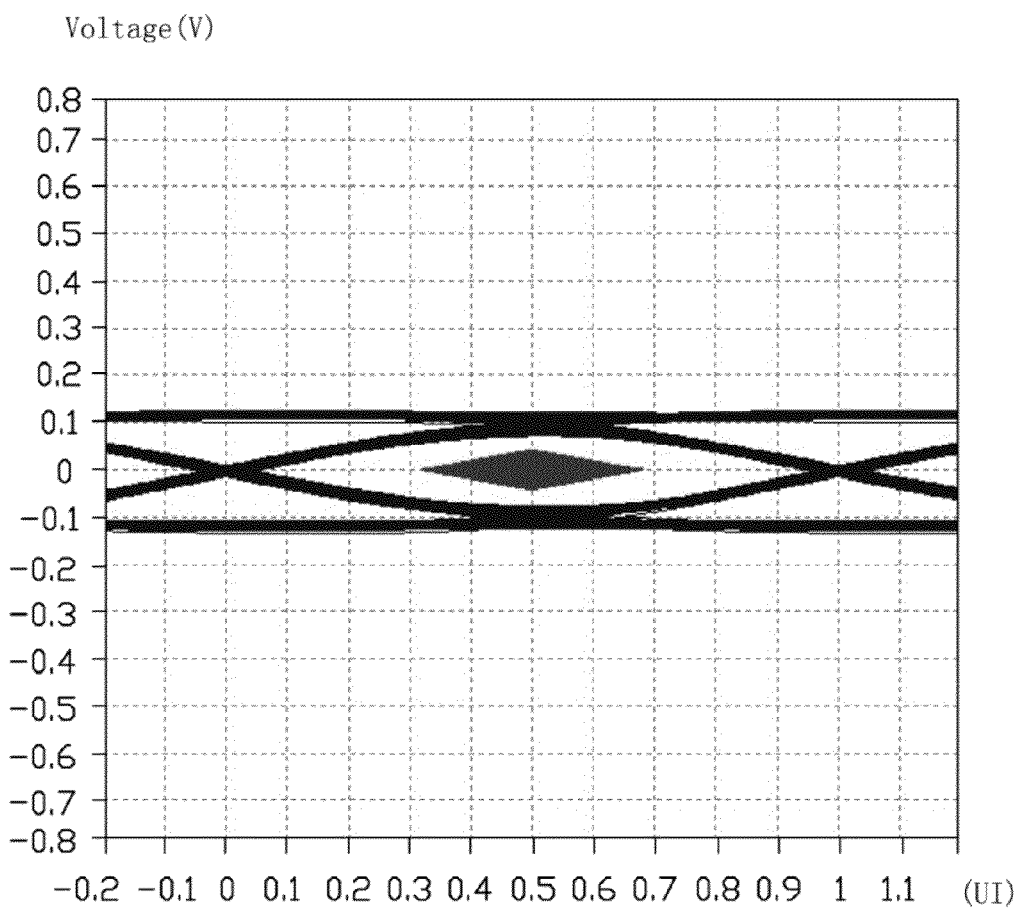
FIG. 5 is an eye pattern of the signal that has been processed by the equalizer shown in FIG. 1 and has the wave shape shown in FIG. 3.

FIG. 4 is an eye pattern of the above-described signal that has not been processed by the equalizer 100, and FIG. 5 is an eye pattern of the above-described signal that has been processed by the equalizer 100. In this embodiment, resistances of the resistors R1 and R4 are about 100 ohms, and resistances of the resistors R2 and R3 are about 10 ohms. The eye of the signal that has not been processed by the equalizer 100 has greater undulations than the eye of the signal that has been processed by the equalizer 100, and has less height than the eye pattern of the signal that has been processed by the equalizer 100. Communication quality of the signal that has been processed by the equalizer 100 is better than communication quality of the signal that has not been processed by the equalizer 100. Therefore, the equalizer 100 can significantly improve electronic communication quality.

As detailed above, when electronic communication signals pass through the equalizer 100, the equalizer 100 provides two stages of compensation to the electronic communication signals. Compared with typical equalizers, the equalizer 100 provides more compensation for the electronic communication signals. In other embodiments, the equalizer 100 can include more vias and resistors electrically connected in series, and each electronic communication signal passing through the equalizer 100 can be processed more than twice according to the aforementioned method.

It is to be further understood that even though numerous characteristics and advantages of the present embodiments have been set forth in the foregoing description, together with details of structures and functions of various embodiments, the disclosure is illustrative only, and changes may be made in detail, especially in matters of arrangement of parts within the principles of the present invention to the full extent indicated by the broad general meaning of the terms in which the appended claims are expressed.

What is claimed is:

1. An equalizer for compensating transmission loss of electronic communication signals, comprising:
    a circuit board configured to transmit the electronic communication signals; and
    a compensation module mounted in and electrically connected to the circuit board;
    wherein the compensation module comprises first and second transmission lines, first to fourth resistors, first and second vias, and first to fourth micro-strips; the first and second transmission lines, the first to fourth resistors, and the first to fourth micro-strips are mounted on an outer surface of a signal layer of the circuit board, the first and second vias extend through the circuit board and are electrically connected to a ground layer of the circuit board; first terminals of the first and second resistors are electrically connected to the ground layer through the first via, first terminals of the third and fourth resistors are electrically connected to the ground layer through the second via; a second terminal of the first resistor is electrically connected to the first transmission line through the first micro-strip, and is further electrically connected to a second terminal of the second resistor through the second micro-strip; a second terminal of the third resistor is electrically connected to the second transmission line through the third micro-strip, and is further electrically connected to a second terminal of the fourth resistor through the fourth micro-strip.

2. The equalizer of claim 1, wherein each of the first and third micro-strips is made up two perpendicular lines.

3. The equalizer of claim 1, wherein each of the second and fourth micro-strips is a smooth curve.

4. The equalizer of claim 1, wherein the first and second resistors, and the first and second micro-strips are symmetric as the third and fourth resistor, and the third and fourth micro-strips with a middle line between the first and second transmission lines.

\* \* \* \* \*